No. 653,520. Patented July 10, 1900.
F. MONIOT & L. GARCIN.
KINETOSCOPE ATTACHMENT FOR STEREOSCOPES.
(Application filed Aug. 19, 1899.)
(No Model.) 2 Sheets—Sheet 1.

WITNESSES:
Edward Thorpe
C. R. Ferguson

INVENTORS
F. Moniot
BY L. Garcin
ATTORNEYS

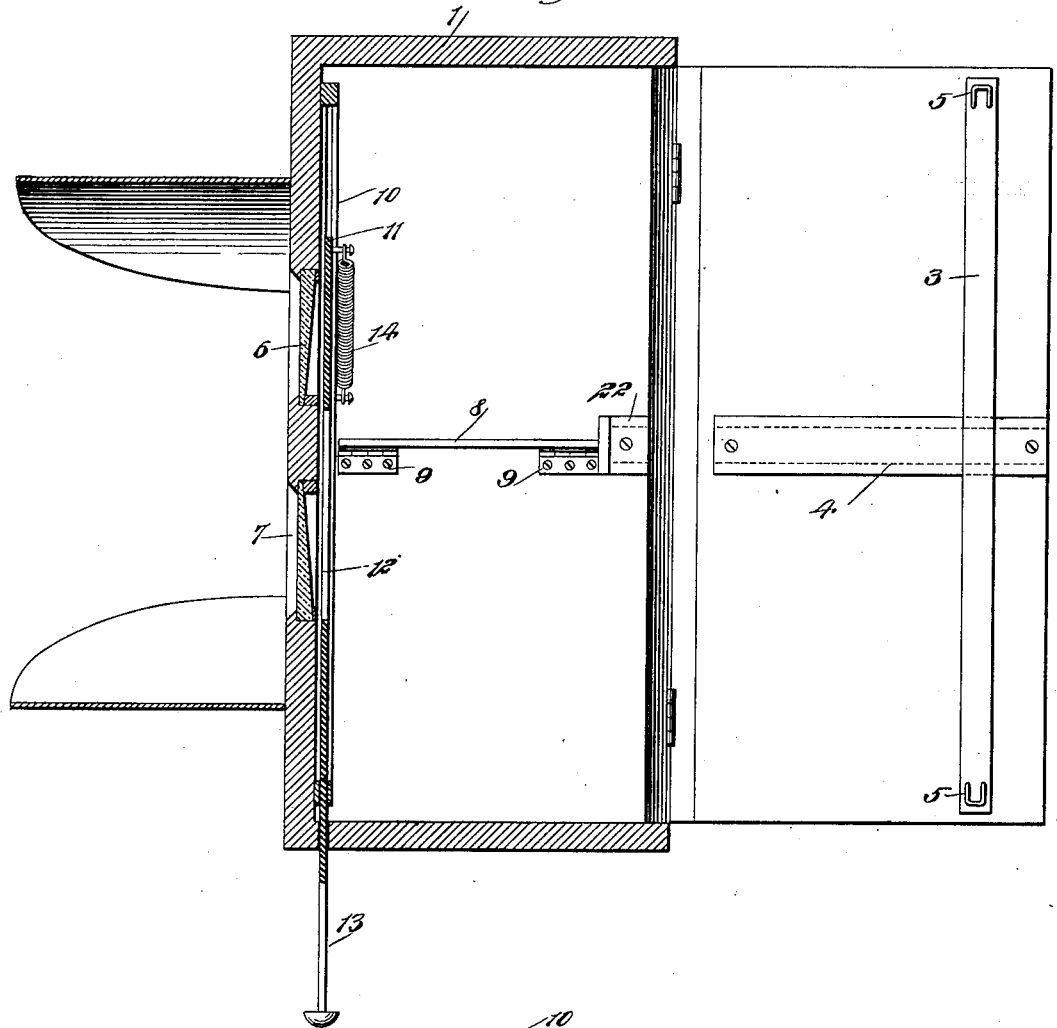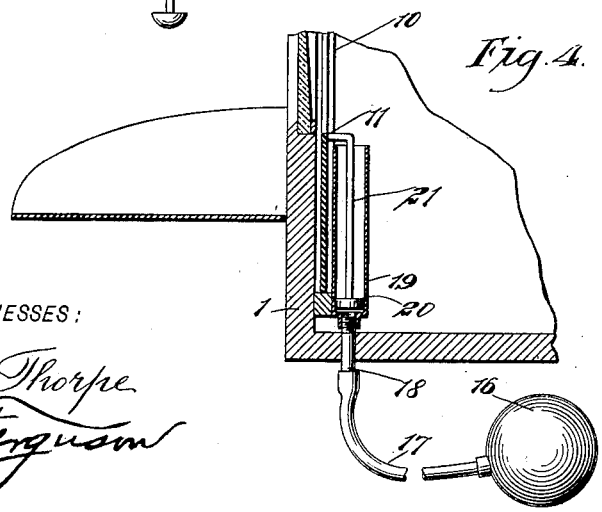

UNITED STATES PATENT OFFICE.

FRANK MONIOT AND LOUIS GARCIN, OF NEW YORK, N. Y.

KINETOSCOPE ATTACHMENT FOR STEREOSCOPES.

SPECIFICATION forming part of Letters Patent No. 653,520, dated July 10, 1900.

Application filed August 19, 1899. Serial No. 727,805. (No model.)

*To all whom it may concern:*

Be it known that we, FRANK MONIOT and LOUIS GARCIN, of the city of New York, borough of Manhattan, in the county of New York and State of New York, have invented a new and Improved Kinetoscope Attachment for Stereoscopes, of which the following is a full, clear, and exact description.

This invention relates to improvements in stereoscopes; and the object is to provide a stereoscope so arranged that it may be used for viewing pictures in the usual manner and also for viewing "animated" pictures—that is, having an attachment by the operation of which the figures of a picture under view will have the appearance of moving.

We will describe a stereoscope embodying our invention and then point out the novel features in the appended claims.

Reference is to be had to the accompanying drawings, forming a part of this specification, in which similar characters of reference indicate corresponding parts in all the figures.

Figure 1:
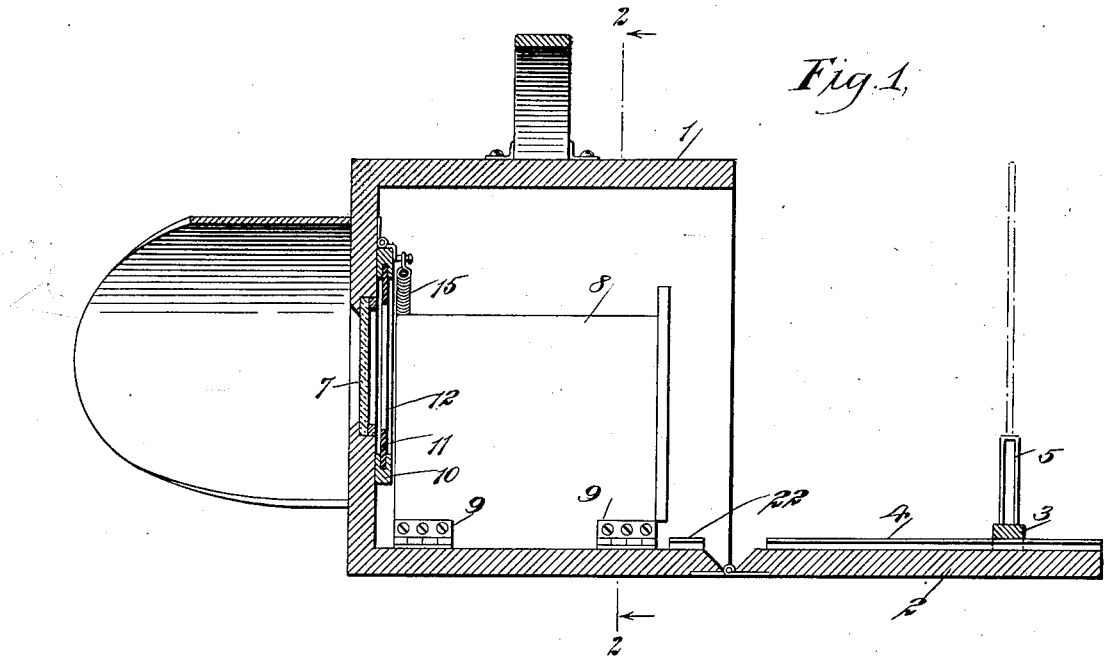
Figure 2:
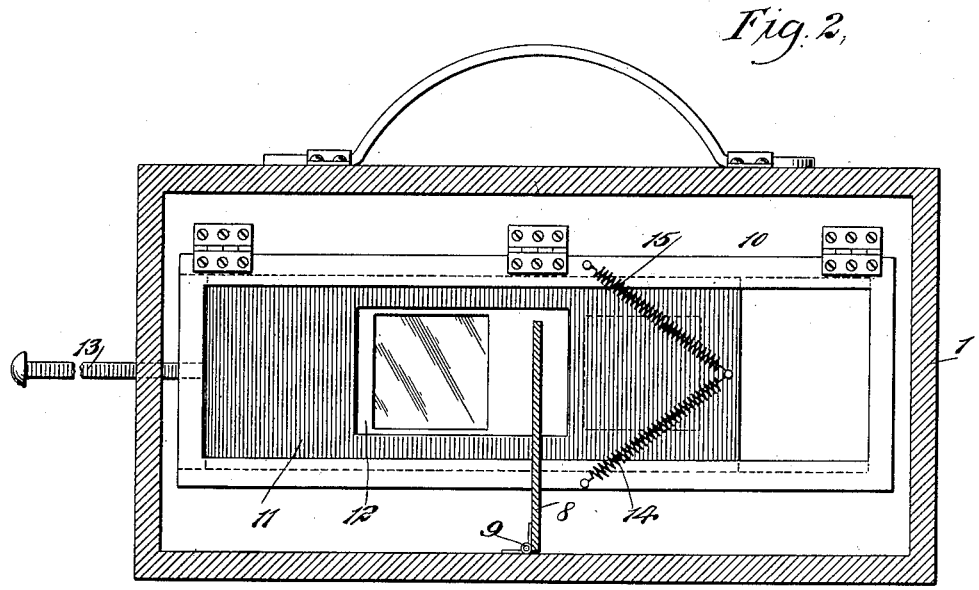

Figure 1 is a sectional elevation of a stereoscope embodying our invention. Fig. 2 is a section on the line 2 2 of Fig. 1. Fig. 3 is a horizontal section, and Fig. 4 is a section showing a modification.

The stereoscope comprises a box 1, having a swinging portion 2 at its front, which may be used to close the box and also may be used by turning it downward to support the slide 3, which is adjustable on a rail 4, attached to the swinging portion 2. The slide 3 has the usual clips 5 at its ends for engaging the ends of a picture-card. In the rear wall of the box the two lenses 6 and 7 are arranged in the usual manner, and within the box is the separating-plate 8. This separating-plate has hinged connections 9 with the bottom of the box, so that it may be folded downward for a purpose to be hereinafter described.

Arranged to swing on the inner side of the front wall of the box is a shutter-carrying frame 10. This frame 10 is hinged at its top to said wall of the box. Mounted to slide in the frame 10 is a shutter 11, having an opening 12. This shutter is designed by moving over the inner sides of the lenses to alternately open and close the view through said lenses. A stem 13 extends through an opening in an end wall of the box 1 and through an opening in an end piece of the frame 10 and engages with an end of the shutter. By pushing inward upon this stem 13 the shutter will be moved in one direction and upon releasing the pressure on the stem the shutter will be moved in the opposite direction by means of a spring or springs. We have here shown two spring 14 15 connected to the inner end of the shutter and to the bottom and top rails of the frame 10. Instead of manually pushing the shutter inward by placing a finger on the stem 13 it may be moved inward by any suitable motor. In Fig. 4 we have shown a motor in the form of an air-bulb 16, having a flexible pipe connection 17 with a tube 18, which extends through an opening in the end of the box 1 and has removable connection with the end of a cylinder 19, mounted on the frame 10 and in which a piston 20 operates, the stem 21 of this piston having connection with the shutter. By compressing the bulb 16 the air striking against the piston 20 will force the shutter inward and the spring or springs, before described, will force the shutter outward, when the bulb is allowed to expand.

The two pictures to be viewed are mounted on a card in a similar manner to the ordinary stereopticon view. The two pictures, however, will illustrate a figure in different positions, so that when viewed through the lenses and upon rapidly operating the shutter the figure will have the appearance of moving—such, for instance, as a man sawing wood or the like.

When the instrument is to be used in the ordinary manner when viewing ordinary stereopticon views, the frame 10, carrying the shutter, is to be swung upward. This may be done after first swinging the separating-plate downward. After raising the frame the plate 8 is to be returned to its vertical position, and the frame may rest on the upper edge thereof. Of course before the frame can be swung upward the stem 13 must be removed when such device is used, or when the motor shown in Fig. 4 is used the tube 18 must be unscrewed from the cylinder 19.

The box is provided with a suitable handle, and when not in use after turning the plate 8 down the several pictures may be packed in the box, and the slide 3 may be also moved into the box and engaged with a track-section 22.

Having thus fully described our invention, we claim as new and desire to secure by Letters Patent—

1. A stereoscope, comprising a box having lenses in its front wall, a frame mounted to swing on said front wall, a shutter mounted to slide in said frame and having an opening, and a separating-plate in the box, substantially as specified.

2. A stereoscope, comprising a box having lenses in its front wall, a frame mounted to swing on the inner side of said wall, a shutter mounted to slide in said frame and having an opening, and a swinging separating-plate in the box, substantially as specified.

3. A stereoscope comprising a box, lenses in the front wall of the box, a frame hinged at its top to the inner side of the front wall of the box and adapted to be swung upward, a shutter carried by said frame, and means for supporting the frame when the latter is swung upward, substantially as specified.

4. A stereoscope comprising a box provided with stereoscopic lenses, a shutter adapted to alternately open and close the view through the lenses, whereby the device may be employed for viewing animated pictures, the said shutter being mounted to swing whereby it is adapted to be moved out of position relative to the lenses, to change the device into an ordinary stereoscope, and means for holding the shutter in the latter position, substantially as set forth.

FRANK MONIOT.
LOUIS GARCIN.

Witnesses:
JNO. M. RITTER,
C. R. FERGUSON.